Dec. 9, 1930.                    J. RINNE                    1,784,111
        METHOD OF AND MACHINE FOR MANUFACTURING MATCHES AND MATCH TAPE
                        Filed March 11, 1925      9 Sheets-Sheet 1

Dec. 9, 1930. J. RINNE 1,784,111
METHOD OF AND MACHINE FOR MANUFACTURING MATCHES AND MATCH TAPE
Filed March 11, 1925 9 Sheets-Sheet 4

WITNESSES:

INVENTOR.

BY

ATTORNEY.

Dec. 9, 1930. J. RINNE 1,784,111
METHOD OF AND MACHINE FOR MANUFACTURING MATCHES AND MATCH TAPE
Filed March 11, 1925 9 Sheets-Sheet 5

Dec. 9, 1930.  J. RINNE  1,784,111
METHOD OF AND MACHINE FOR MANUFACTURING MATCHES AND MATCH TAPE
Filed March 11, 1925   9 Sheets-Sheet 6

WITNESSES:  INVENTOR.
  BY
  ATTORNEY.

Dec. 9, 1930.  J. RINNE  1,784,111
METHOD OF AND MACHINE FOR MANUFACTURING MATCHES AND MATCH TAPE
Filed March 11, 1925  9 Sheets-Sheet 8

WITNESSES:  INVENTOR.
  BY
  ATTORNEY.

Dec. 9, 1930.  J. RINNE  1,784,111
METHOD OF AND MACHINE FOR MANUFACTURING MATCHES AND MATCH TAPE
Filed March 11, 1925  9 Sheets-Sheet 9

WITNESSES:

INVENTOR.

BY

ATTORNEY.

Patented Dec. 9, 1930

1,784,111

UNITED STATES PATENT OFFICE

JOHN RINNE, OF RUTLEDGE, PENNSYLVANIA

METHOD OF AND MACHINE FOR MANUFACTURING MATCHES AND MATCH TAPE

Application filed March 11, 1925. Serial No. 14,722.

This invention relates to an improved method of manufacturing matches and to machines therefor.

It further relates to a novel manner of packaging matches, wherein the matches form a continuous tape or strip which may be rolled up.

It is an object of my invention to simplify the manufacture of matches and to reduce the cost thereof.

Another object of my invention is to reduce the waste involved in forming the match stems or splints.

It is a further object of my invention to provide a package of matches which shall be compact, and wherein a minimum amount of material is required to connect the match stems or splints.

In accordance with my invention, splints of the matches are made of paper, or other chemical composition, and form in the final product a continuous long tape or band that can be rolled on a reel. Thin cardboard, thick paper or other inflammable sheet material, that can be rolled in rolls of any size and is of suitable thickness is used as raw material. These rolls, which are arranged to turn freely on shafts supported in bearings at both ends, are unwound gradually and the sheet material is drawn by power driven rolls over a heated table to be slowly heated to such a temperature that molten paraffin or other combustible chemical that is applied to it by felt covered rollers, saturates the whole width of the sheet simultaneously, and makes it easy to ignite and burn, also pliable while warm but stiff when cold. After being impregnated, the sheet is drawn by another pair of rollers and fed between punching rollers, which pierce through it rows of rectangular perforations across the whole width of the sheet. From the perforating rollers it is drawn between slot cutting rollers which cut short slots lengthwise in the sheet, two slots starting from each previously punched rectangular perforation, thus making one end of each splint free. From the cutters it is fed between die rollers which squeeze the free end of each splint for a short distance from the tip and knurl it to give the head-forming substance a better gripping surface and to make the finished head smaller. After leaving these rollers the splint sheet is drawn through an end bending apparatus where the free ends are bent down and kept in that position for dipping the ends in chemicals to form the heads. This is done by bars which carry chemicals and are brought in contact with the bent tips. With the ends dipped the sheet is drawn over drying tables for drying the heads. When dry, the bent matches are straightened back by a straightening plate and finally rolled in place by soft rollers, which press the heads back into the rectangular holes in the sheet. Finally the match belt or web, which is totally formed by matches connected to each other by small parts, is wound in a roll.

This roll is unwound again by rollers, the head ends of the matches leading, and the sheet is forced between a pair of cutter rollers which cut the whole sheet in strips whose width is governed by the number of matches wanted in width. These ribbons are all cut simultaneously to certain lengths, the length depending upon the size of the final reel or total number of matches wanted in the same. Ribbons are wound on cardboard core tubes, and small reels are formed by a pair of reeling rollers. Final match reels are put in cardboard boxes or containers, or metal cases which are moisture proof when closed.

This being a description of the method of manufacture of matches in tape form, the following will be a detailed description of the work accomplished by each unit of the machine, reference being made to the accompanying drawings in which.

The machine is built upon two parallel side beams, which form the frame work of the same. Upon this frame work are mounted bearings for a shaft carrying a roll "a" of sheet material, shown in Figures 4 and 5. The sheet is unwound and passed between the guiding rollers "r" and "r—1" in Figures 4, 5, 6 and 7. These rollers guide it sideways, "r—1" having a flange "b" at each end for that purpose. After passing over the heating table "L—3" (Figures 4 and 5) it is drawn while warm, between impregnating rollers "r—2" and "r—3", Figures 4, 5, 8 and 9. These rollers are hollow inside and have small holes all over extending through the shell. Through these holes warm impregnating substance is discharged to the covering felt "c" which saturates the sheet. The hot chemical is piped in to the rollers through a hole in one end of the shaft and when cool discharged through the other.

Figure 1:
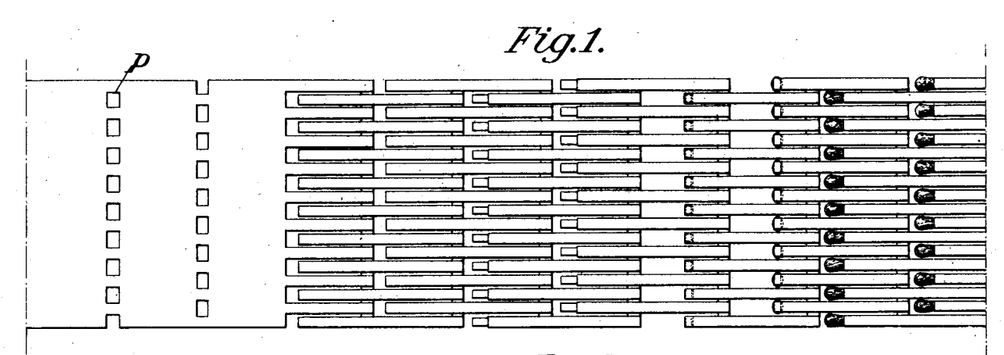
Fig. 1 is a plan view of the sheet material in different stages of manufacture.
Figures 2, 3:
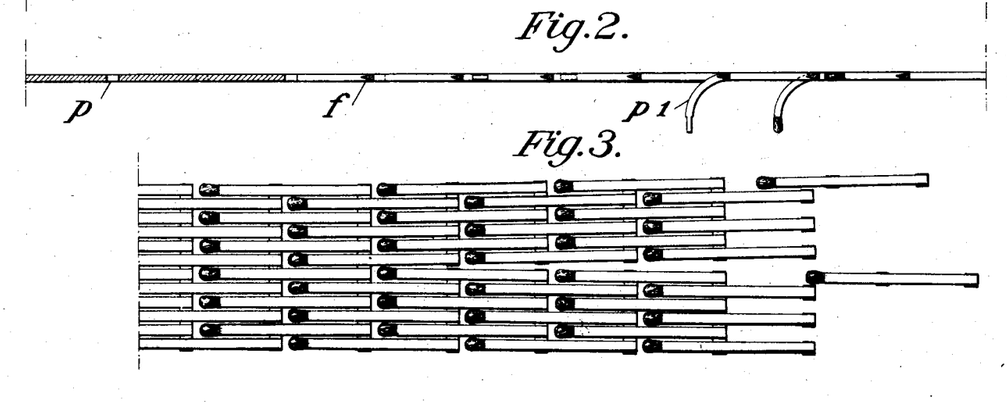
Fig. 2 is a longitudinal sectional view of the sheet shown in Fig. 1.
Fig. 3 shows a strip of finished matches.
Figure 16:
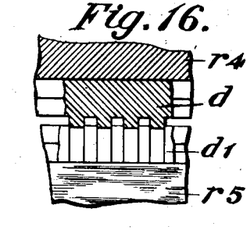
Figures 16 and 17 are full size views of the punching dies.
Figure 17:
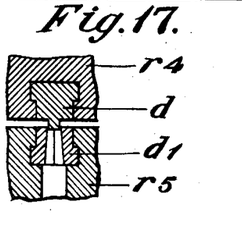

From the impregnating rollers the sheet is drawn between the perforating rollers "r—4" and "r—5" Figures 4, 5, 12 and 13. Small rectangular perforations "p" (Figures 1 and 2) are punched in rows across the whole width of the sheet by punches "d" and dies "d—1", of which a full size view is shown in Figures 16 and 17. The perforations are so arranged that the perforations in each row are in staggered relation to the perforations in adjoining rows. These punches and dies are arranged alternating in upper and lower rollers to keep the sheet from being attached to the rollers by the punches, and under each die block there is a slot through the roller shell extending the whole length of the roller, to emit small chips formed in punching the sheet. These chips are carried away by air pressure through openings provided in the roller shafts for that purpose.

Figure 18:
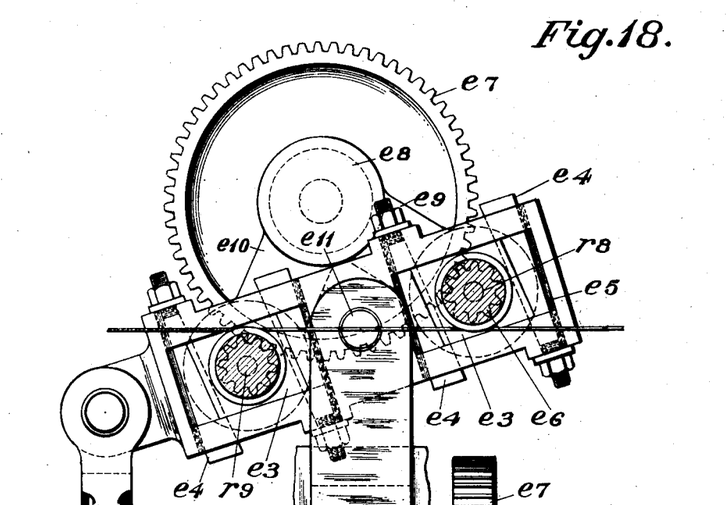
Figures 18 and 19 show the details of high speed rotary slot cutting apparatus.
Figure 19:
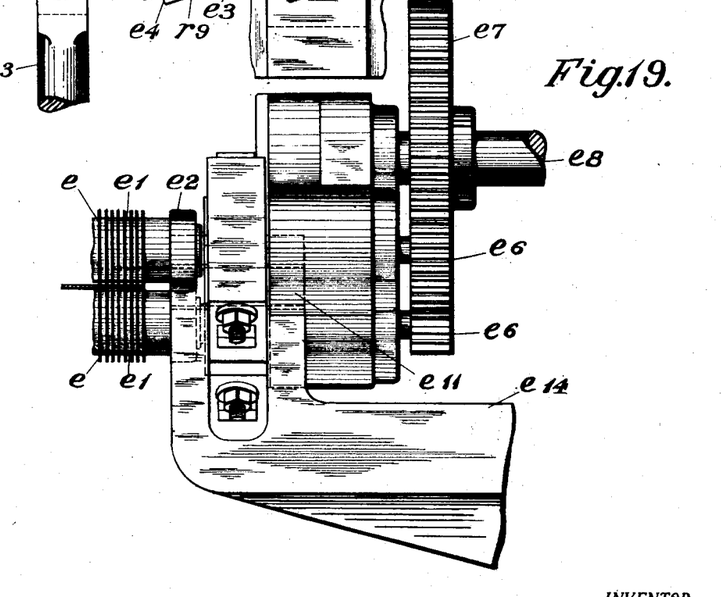

From here the sheet is pulled by rollers "r—6" and "r—7" between rotary cutters for cutting short lengthwise slots. This device consists of two shafts, "r—8" and "r—9" Figures 18 and 19, supported at both ends by frame blocks. On these shafts are mounted several cutter disks "e" which are spaced from each other by rings "e—1", and nuts "e—2" at the ends of the shafts, tie the whole to a rigid well balanced shaft. These rollers rotate freely in bearing "e—3" in the frame blocks. The positions of these bearings are adjusted by wedges "e—4" which can be moved up and down by nuts in the ends, and thus move the bearings "e—3" back and forth as required. In case more adjustment is wanted shims "e—5" behind the wedges can be added or removed. The rollers get their rotary motion by gears "e—6" at the ends of the rollers, and these gears are rotated at high speed by a driving gear "e—7" which is mounted on separate driving shaft "e—8". This shaft with bearings is connected to the rolled bearings by two distance pieces "e—9" and "e—10" which are pivoted with each other at "e—8" and at the bearings "e—3". Thus they keep the gear center distances always constant, even if the bearings "e—3" change position. Motion to shaft "e—8" is transmitted by a high speed power unit, causing the cutter disks to rotate at a very high speed, such as 15,000 revolutions per minute. At this speed the action of the cutters is a burning action rather than an ordinary cuting action. Any equivalent form of cutter, however, may be used to cut the slots. The whole unit is able to rock on pivot pins "e—11" by which it is supported at both ends by brackets "e—14". This motion is produced by eccentric "e—12" (Figure 4) on the shaft "s—6" (Figures 4 and 5) operating in the end of rod "e—13". Through the rocking motion the cutter disks are brought in contact with the match sheet from opposite sides simultaneously. The cutters which act from below first cut slots starting from the rectangular holes and then the cutters from above finish the same cuts, so that finally only small triangular sections "f" (Figure 2) hold the whole sheet together.

Figure 4:
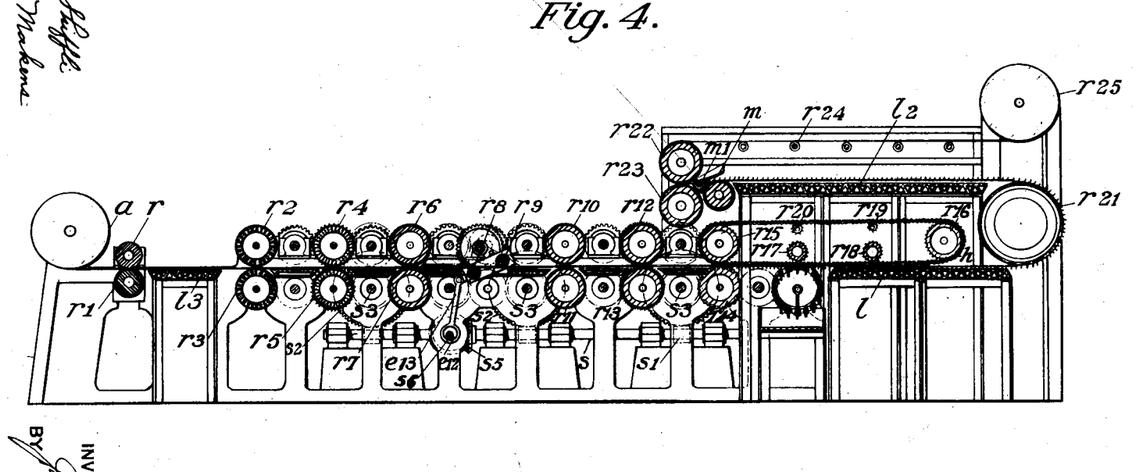
Figure 4 is a side elevation, partly in section, of the machine for manufacturing the match sheet.
Figure 5:
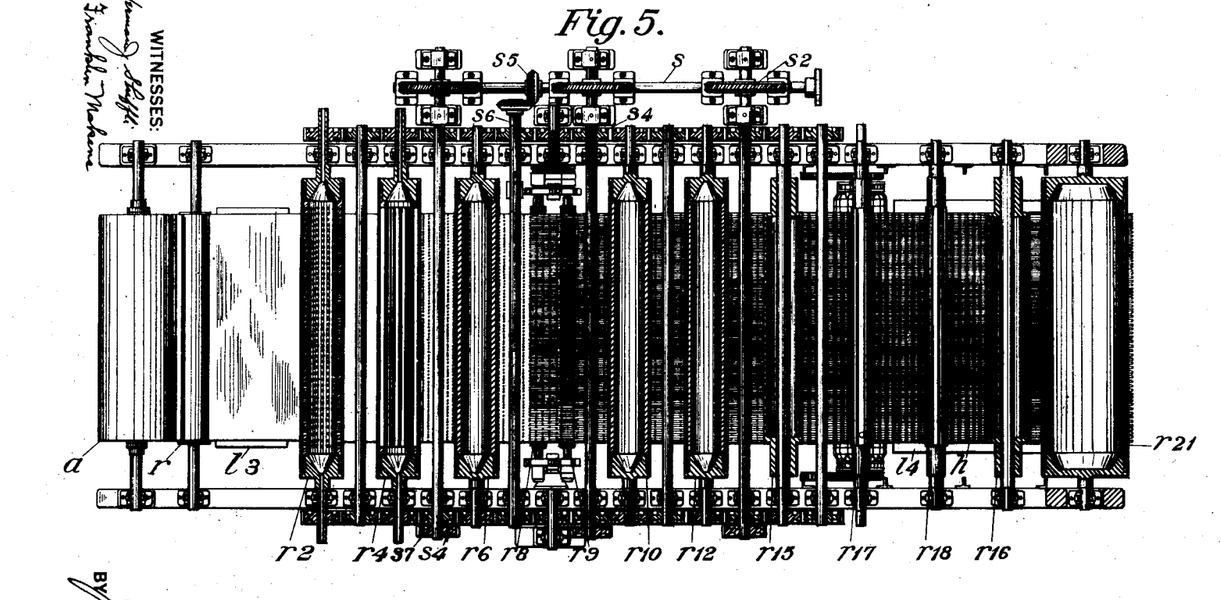
Figure 5 is a plan view of the same.
Figure 10:
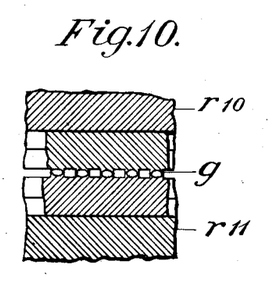
Figures 10 and 11 are full size sectional views of the match end squeezing dies.
Figure 11:
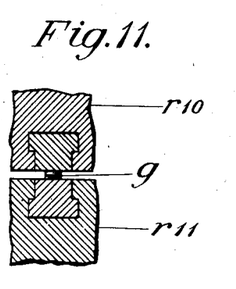
Figure 12:
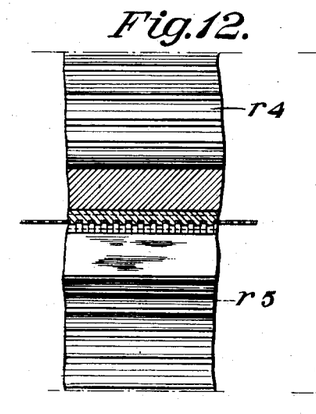
Figures 12 and 13 show the hole punching rollers.
Figure 13:
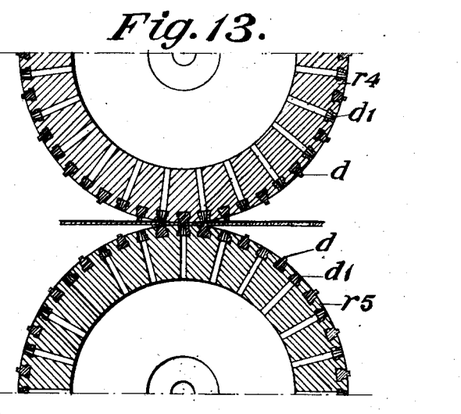
Figure 14:
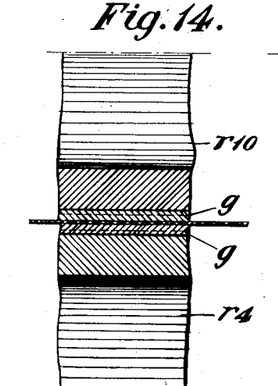
Figures 14 and 15 are match end squeezing and knurling die rollers.
Figure 15:
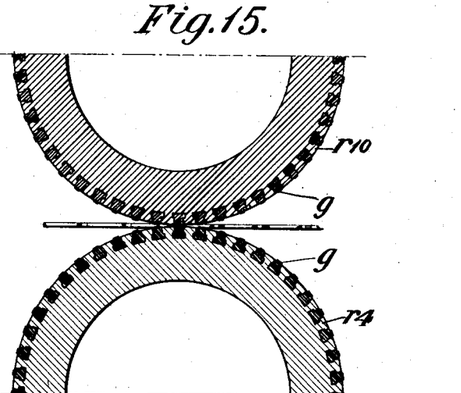

From the slot cutting device the sheet is drawn between match end squeezing dies by rollers "r—10" and "r—11" (Figures 4 and 5). These dies, Figures 10 and 11 are formed by small rectangular dies "g" on bars which are T-slotted in roller shell "r—12" and "r—13" Figures 14 and 15. These dies have on their ends small half round hollows which, coming together in pairs squeeze the ends of the splints to a rounded section and at the same time with their small corrugations on the pressing surfaces make small straight lengthwise knurling on the splint tip. This is to give the chemicals a better grip and to have smaller heads after dipping, so that they can be easily pushed back in the rectangular openings in the sheet of material.

Figure 20:
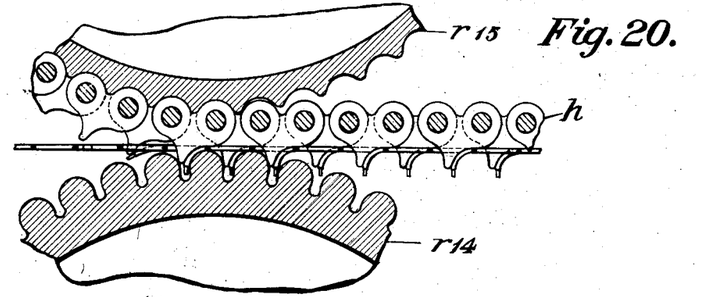
Figure 20 shows the match end bending device.

After the tips on the splints are formed the free ends are bent down till the ends are vertical to the main sheet, "p—1" (Figure 2) by an endless wide bending linkbelt "h" Figures 4 and 20 and the forming roller "r—14" Figure 20. The linkbelt runs on two sprocket rollers "r—15" and "r—16" Figure 4 and idlers "r—17", "r—18", "r—19" and "r—20" and is composed of links in staggered rows. The links are designed in length and width so that there will be one link for each splint in the splint sheet and so that a link will register with each splint as the splint sheet passes under the linkbelt. Each link has a dull tooth, a little narrower than the width of the splint, extending outwardly from the linkbelt. As each tooth comes into registry with its splint, it presses the free end thereof against the round face of a tooth on the forming roller "r—14", giving it a slow rounded bend. The tooth keeps the free end of the splint bent outwardly from the sheet while it passes over the dipping apparatus. The chain gradually rises clear from the sheet so that pressure on the back of the splints is relieved gradually, "h" Figure 4.

Figures 21, 22:
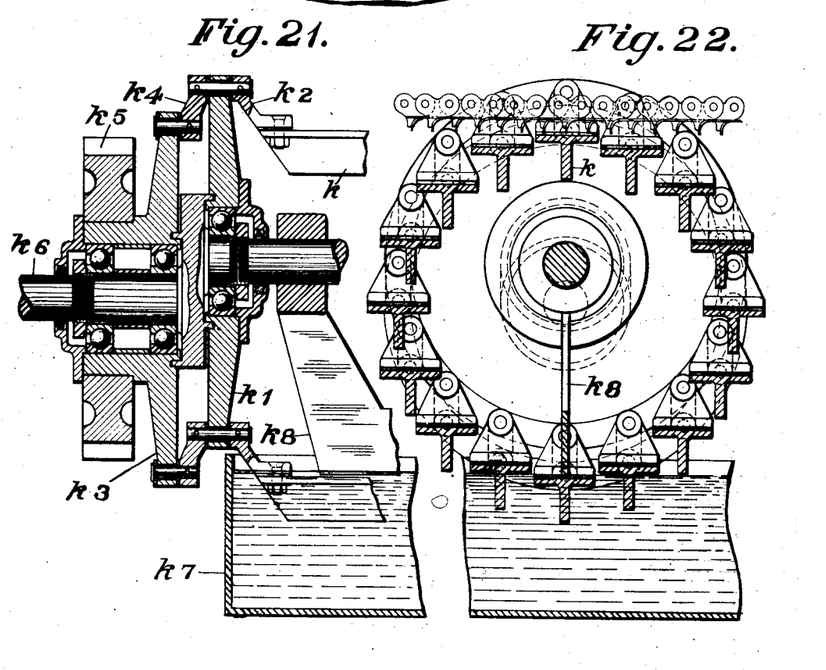
Figures 21 and 22 show the head dipping apparatus.

The dipping apparatus consists of a series of T-bars "k" (Figures 21 and 22) which are fastened at both ends to the disks "k—1" by arms "k—2". These disks are connected to disks "k—3" by links "k—4". The disks "k—3" get their rotary motion by gear "k—5" and all disks rotate on ball bearings on a shaft "k—6" which is stationary, and carries the whole device. The end portions of shaft "k—6", on which the disks "k—3" are mounted, are off-set downwardly from the central portion supporting disk "k—1", a distance equal to the distance between the centers of the pivots in links "k—4". See Fig. 21. Through this arrangement, the top surfaces of bars "k" always stay in a horizontal position and the chemicals that are picked up by them from a trough "k—7" stay in a thin layer on them. While these chemicals on bars, which rotate with the same peripheral speed as the match belt moves forward, on their upper cycle get in contact with the match tips, they form the heads on the same. These bars are wide enough to dip several rows of splints at the same time. On the shaft, "k—6" is pivotally suspended a plate "k—8" which is stationary, being retained in position by gravity or other means. This plate which extends the whole length of the dipping bars comes in contact at its bottom edge with the top surface of the dipping bars while they are at their lowest position and wipes the cold chemicals off so that each bar on its upward position is always loaded with new and warm chemicals.

After having the heads dipped the match belt passes over a drying table "l" Figure 4 for initially drying the heads, and around roller "r—21" Figure 4, and after that over another and final drying table "l—2". The head ends of the matches project upwardly as the sheet passes over drying table "l—2", and as the heat softens them they tend to fall back into the sheet. With the heads dried, the bent matches are straightened by straightening plate "m" Figure 4 which forces them down against support plate "m—1", and by rollers "r—22" and "r—23" which are covered with soft material, as rubber, and force the heads back in the belt. After this the sheet is run over idler rollers "r—24" to be rolled up as finished match sheet on a roller "r—25" Figure 4.

The whole machinery except slot cutting rollers get their motive power by a main shaft "s" Figures 4 and 5. On this main shaft are mounted several worm gears "s—1" which drive the worm wheels "s—2" mounted on shafts "s—3" and on the same shafts are gears "s—4" which give on both sides of the whole machine a uniform motion to the gear trains. Double set of gears are arranged to eliminate back lash in gears. The lower gear train transmits the power to upper train through gears "s—7" Figure 5. The slot cutting device gets its rocking motion from the main shaft through an eccentric on the shaft "s—6" (Figure 4) and bevel gears "s—5". These gears are so arranged that they turn two revolutions while the match belt moves forward one length of the splint.

Figure 6:
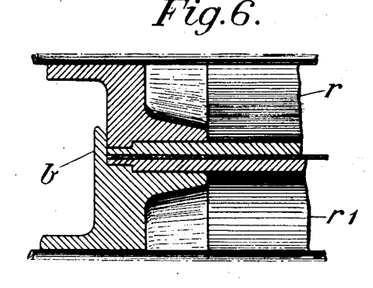
Figures 6 and 7 show details of the guide rollers.
Figure 7:
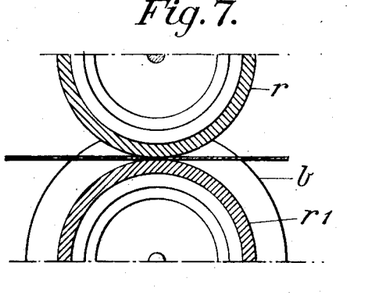
Figure 8:
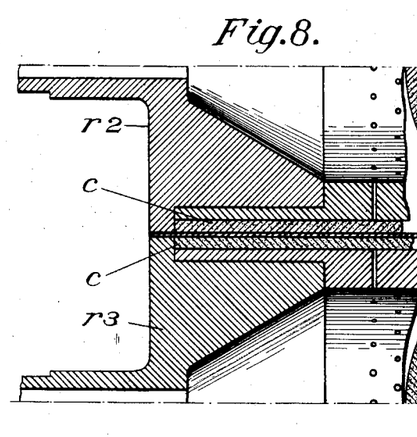
Figures 8 and 9 show the impregnating rollers.
Figure 9:
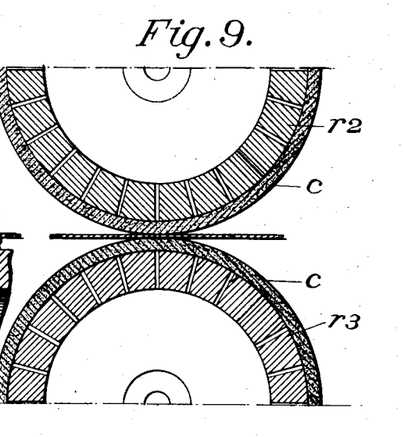
Figure 24:
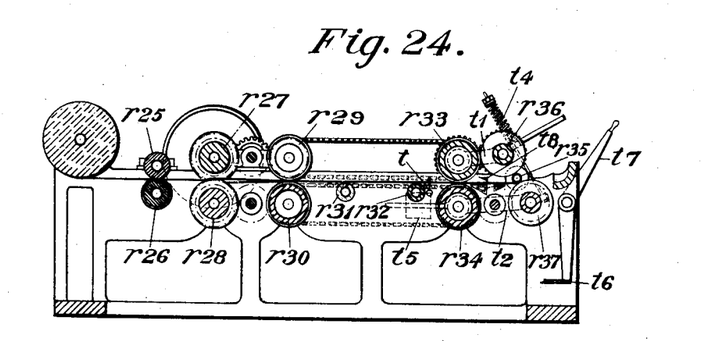
Figure 24 is a vertical longitudinal section of the same.
Figure 25:
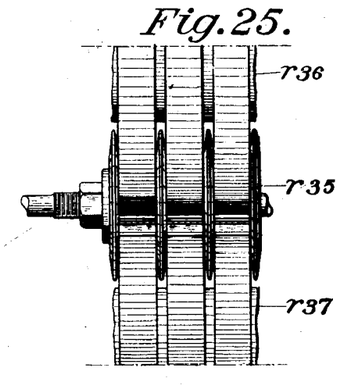
Figures 25 and 26 show details of reel winding device.

The finished match sheet roll is taken to another machine which consists of side frames and a series of rollers between them. The sheet roll on a shaft is first placed on supports with bearings so arranged that it is free to be unwound and the sheet is passed between guide rollers, "r—40" and "r—26" (Figures 23 and 24) with the heads of the matches leading. These guide rollers are identical with rollers "r—1" and "r—2" (Figures 6 and 7). These rollers guide the sheet between tape cutting rollers "r—27" and "r—28". These rollers consist of core drums on which is secured alternately cutter disks and spacers of equal thickness so that disks on one cutter roller fit in the grooves formed by spacer rings on the other, and in such a way form a shearing action between the disks. The thickness of each disk and spacer is equal to a certain number of the matches in width, depending upon the width wanted in the final match tape. After cutting, these match tapes are run between rollers "r—29" and "r—30" and over idler rollers "r—31" and "r—32" against a bar "t" Figures 23 and 24. This bar is provided with round fingers or prongs. These fingers separate the tapes from one another before they are run between driving rollers "r—33" and "r—34". These rollers advance the tapes towards the final reeling shaft "r—35" and also drive by gears located in each end of the roller shafts the reeling rollers "r—36" and "r—37". The bearings carrying these rollers are connected by links "t—1" and "t—2" with rollers "r—33" and "r—34" shafts, so that they can be moved up and down as required. Rollers "r—36" and "r—37" consist of a center shaft on which there is arranged a set of disks and spacers, as shown in Figure 25.

Figure 23:
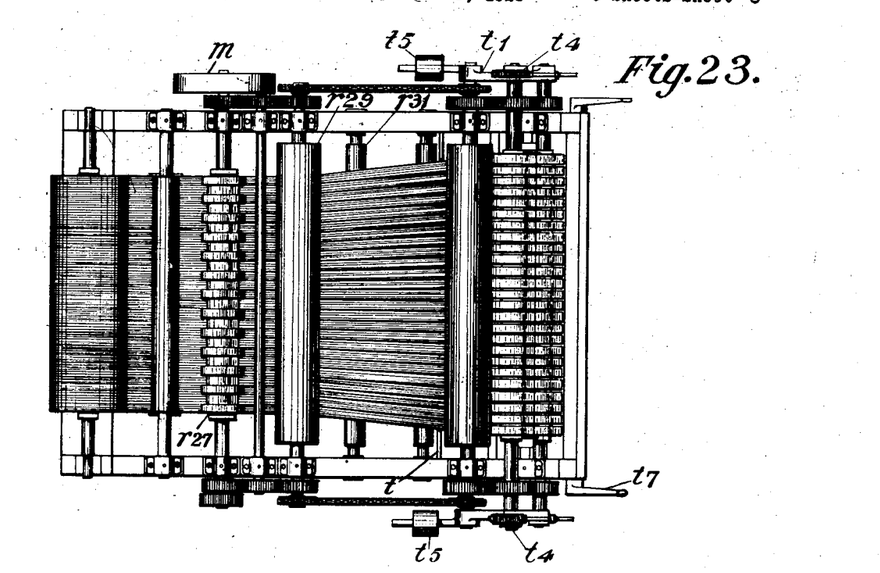
Figure 23 is a plan view of the tape cutting and reel winding machine.
Figure 26:
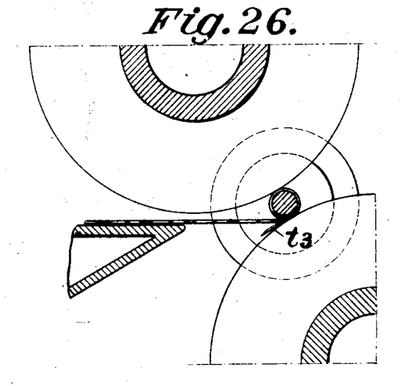

These disks fit between flanges on reel shaft "r—35" and press against the core on this shaft, on which the match tapes are to be wound, and give them rotary motion. Before reeling action starts there are on the reel shaft mounted alternately thin flanges and reel cores. These reel cores consists of cardboard rolled to a tubular form with a small flap of the material left loose on outer surfaces, "t—3" Figure 26. These flanges and cores are held together on the reel shaft by nuts on the end of the shaft. Set on the shaft, all flaps should form a straight line and be coated with wet glue. When the core shaft is in position the ends of the tapes are driven against the cores by rollers "r—33" and "r—34" so that the ends enter in the corner formed by the core tubes and flaps. The rollers "r—36" and "r—37" are set in position, the former lowered and the latter raised so that they press against the reeling shaft. When the machine is started, rolls "r—36" and "r—37" press against the reel shaft and impart rotary motion to the reel shaft by friction. They also press the flaps against the cores, the tape ends being squeezed between the flaps and the cores, and in that way fastened to the cores. When the reel is growing in size the rollers "r—36" and "r—37" move gradually outwards but they still keep the reels under certain pressure while the reeling is going on, the pressure being actuated by spring "t—4" and counterweights "t—5". When the reels are of the size wanted the machine is stopped and rollers "r—36" and "r—37" are moved out of the way by raising the former and lowering the latter. The tape cutter "t—6" is raised up by pushing down the handle "t—7". This cuts simultaneously all the tapes against the cutter plate "t—8". After the tapes are severed the reel roll is lifted out of the place and a new one inserted. The whole machine is driven by a large pulley "m" on shaft "r—27" and the other rollers get their motion through gears and chain as shown in Figures 23 and 24.

Figure 27:
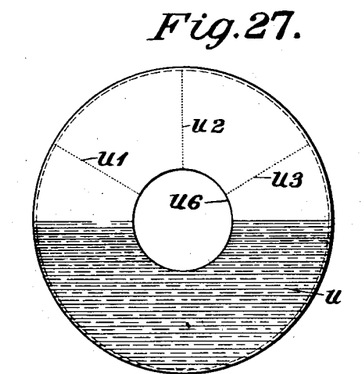
Figures 27 and 28 show the pasteboard match tape reel containers.
Figure 28:
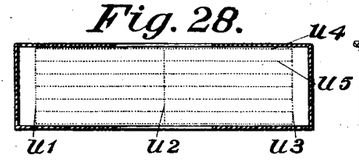
Figure 29:
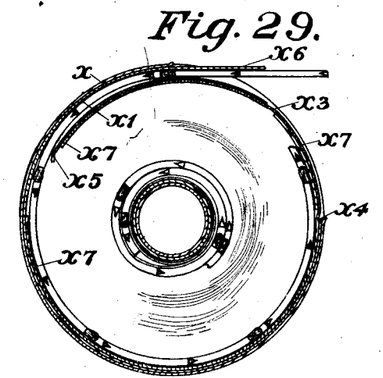
Figures 29 and 30 illustrate the metal container.
Figure 30:
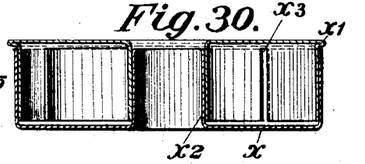

The match reels are then taken from the reeling shaft and put in cardboard containers, Figure 27. These containers have a striking surface painted on each side "u" or any other convenient place. The sides are perforated as shown at "u—1", "u—2" and "u—3" which perforated rows extend past the edges across the rim, Figure 28. The rim is perforated between the extreme cross perforations in parallel rows "u—4" and "u—5". These divide the rim into sections which equal the number of matches in the width of tape. When in use and the matches are wanted from it while it lies flat on the side, the casing is torn up first on the side along the perforations "u—2" to the rim and strip between "u—4" and "u—5" is removed. Side sectors are folded up along the lines "u—1" and "u—3". Matches are picked up sideways from the exposed reel one at a time as needed. When one layer has been totally used the rim strip covering the next match layer is removed and so continued until all the matches in the reel are used. The reel in the container can be rotated through circular hole "u—6" located in the center of the container. If used as a reel running on a shaft that goes through the center openings, the part only between rim perforations "u—1" and "u—2" is removed exposing the whole width of the tape and matches are pulled out through this opening one at a time from the end of the tape as needed. If a permanent container is desired the case shown in Figures 29 and 30 may be used. This case consists of two main parts, outer case or cover "x" and inner case "x—1". The outer case is the shape of a cup with short tube "x—2" sticking up from the bottom. A part of the side is cut away nearly to the bottom. The inner case "x—1" is of the same shape as the outer except that it has two narrow slots "x—3" and "x—4" cut in the side and extending also nearly to the bottom, and part of the rim is cut loose, the cut starting near the slot "x—3" and the loose part extends some distance inside the case "x—5" forming a spring that presses against the match tape. The other part "x—6" is also loose and sticks out forming a guard for tape on outside. When in use a strip of flexible material "x—7" which is covered with striking chemicals on one side and which is of the same width as the match tape is inserted in the inner case so that it goes out through the slot "x—3" and enters through the slot "x—4" and forms in that way a changeable striking surface extending between the said slots on the outer side of the inner case. The matches are pulled loose from the extending end of the tape one at a time as wanted. When not in use the outer case is turned on the inner till it covers all the openings in the same and when both cases are squeezed together they form a damp proof holder.

I claim as my invention:

1. In the machine for manufacturing match tape, in combination, means for heating the sheet of material; means for impregnating the sheet across the whole width; means for punching crosswise rows of rectangular holes in the blank sheet for providing room for match heads; means for cutting slots for partial separation of the splints; means for compressing the tips of the splints and forming lengthwise corrugations on the same; means for bending the loose splint ends for dipping; means for dipping the match tips in the chemicals; means for drying the heads; means for straightening back the bent ends; means for pressing them back in the match sheet;

means for cutting the match sheet in tapes; means for separating the tapes; means for cutting all tapes crosswise simultaneously; means for fastening the tape ends on reels; means for reeling the match tapes on final reels to be put in containers.

2. In the machine for manufacturing match tape, the combination of a pair of impregnating rollers between which the blank sheet is drawn, the said rollers being hollow inside, these hollows having apertures through the shaft at both ends, one for admitting warm chemicals for impregnation of the sheet, and the other for ejecting the chemical while cool, the said warm chemical to be discharged through small holes in the shell to a layer of felt or other soft material covering the roller shell, for saturating the sheet while coming in contact with the same.

3. In a machine for manufacturing match tape, the combination of a link belt, and a bending roller for bending the free ends of splints in a tape or web outwardly therefrom for dipping, the link belt being composed of narrow links having projections extending from the link belt, the roller having teeth thereon, the projections on the links pressing the free ends of the splints against the teeth on the roller.

4. The method of manufacturing matches from a continuous web of sheet material comprising slitting said sheet longitudinally to form match splints, bending one end of each splint outwardly from the sheet, forming a match head on said end, and bending said end back into line with the sheet.

5. The method of manufacturing matches from a continuous web of sheet material comprising slitting said sheet to form splints, each splint being connected intermediate its ends to an adjacent splint, bending one end of each splint outwardly from the sheet, forming a match head on said end, and bending said end back into line with the sheet.

6. The method of manufacturing matches from a continuous web of sheet material comprising slitting said sheet to form splints, each splint being connected intermediate its ends and at one end to an adjacent splint, bending one end of each splint outwardly from the sheet, forming a match head on said end, and bending said end back into line with the sheet.

7. A web of matches formed from a sheet of material, the matches being only partially severed from each other and certain thereof lying in end to end relation, one of said ends being free and having a match head formed thereon.

8. A web of matches extending longitudinally of the web and formed from a sheet of material, the matches being severed from each other and certain thereof lying in end to end relation, one of said ends being free and having a match head formed thereon.

9. A web of matches formed from a sheet of material, the matches being partially severed from each other, there being a plurality of matches across the width of the sheet and certain of said matches lying in end to end relation, one of said ends being free and having a match head formed thereon.

10. A web of sheet material for making matches comprising staggered rows of splints, each splint being joined by weakened portions on opposite sides to adjacent splints at one end and intermediate the ends, the other end of the splint being free.

11. A web of sheet material for making matches comprising only splints extending longitudinally of the sheet and small weakened connecting portions between adjacent splints, laterally adjacent splints being completely severed for the major portion of the length of each.

12. A web of sheet material for making matches comprising only splints extending longitudinally of the sheet and small weakened connecting portions between the sides of adjacent splints, laterally adjacent splints being completely severed for the major portion of the length of each.

13. In a match-making machine, the combination of means for making successive rows of perforations in a web of sheet material, the perforations of each row being disposed in staggered relation to the perforations in adjacent rows, and means for cutting slots in said web from the perforations in one row to points near the perforations in the succeeding row.

14. In a match-making machine, the combination of means for cutting successive rows of perforations in a web of sheet material, the perforations of each row being disposed in staggered relation to the perforations in adjacent rows, and means for cutting slots in said web, each slot extending from one side of a perforation in one row to a point near the opposite side of a perforation in the adjacent row.

15. In a match-making machine, mechanism for punching perforations in a sheet of material comprising two rollers, punches in one of the rollers, dies in the other of the rollers, the latter roller being hollow, and registering openings in the dies and the latter roller through which the material punched from the perforations is forced to the hollow portion.

16. In a match-making machine, mechanism for punching perforations in a sheet of material comprising two rollers, punches in one of the rollers, dies in the other of the rollers, the latter roller being hollow, and registering openings in the dies and the latter roller through which the material punched from the perforations is forced to the hollow portion, and means for discharging said material from the hollow roller through the shaft.

17. Mechanism for punching perforations in sheet material comprising two hollow rollers each roller having alternate rows of punches and dies, the punches of one roller registering with the dies of the other roller.

18. Mechanism for cutting slots in sheet material comprising a shaft having cutter disks thereon and spacers between adjacent disks, and means for moving the cutters into and out of cutting relation to the sheet material.

19. Mechanism for cutting slots in sheet material comprising a shaft having cutter disks and a gear wheel thereon, a driving gear wheel meshing with the first-mentioned gear wheel, and a frame pivoted concentrically with the driving gear wheel and having the shaft rotatably mounted thereon.

20. Mechanism for cutting slots in sheet material comprising a shaft having cutter disks and a gear wheel thereon, a driving gear wheel meshing with the first-mentioned gear wheel, a frame pivoted concentrically with the driving gear wheel and having the shaft rotatably mounted thereon, and means for moving the shaft into and out of cutting relation to the sheet material.

21. In a match-making machine, an endless link belt, each link thereof having a tooth thereon for bending an end of a match splint in a continuous web or strip, and means for holding the continuous web or strip against the linkbelt, said links being disposed in transverse rows and the links of each row being spaced and staggered with respect to the links of adjacent rows.

22. In a match-making machine, the combination of a roller having teeth thereon and an endless linkbelt, each link thereof having a tooth thereon for bending a free end of a match splint of a continuous web or strip against the face of a tooth on the roller, said links being disposed in transverse rows and the links of each row being spaced and staggered with respect to the links of adjacent rows.

23. In a match-making machine, the combination of a roller having roundfaced teeth thereon and an endless linkbelt, each link thereof having a dull tooth thereon for bending a free end of a match splint of a continuous web or strip against the roundface of a tooth on the roller, said links being disposed in transverse rows and the links of each row being spaced and staggered with respect to the links of adjacent rows.

24. In a match-making machine, dipping apparatus comprising a pair of rotating disks or wheels, a plurality of bars pivoted at their ends around the circumference of the disks or wheels, the tops of the bars presenting a horizontal plane surface, and means maintaining said surface in horizontal position.

25. In a match-making machine, dipping apparatus comprising a pivotally supported bar, a plane surface on the top of said bar, means for moving said bar transversely in a circle, and means for maintaining said plane surface in a horizontal position.

26. In a match-making machine, dipping apparatus comprising a pivotally supported bar, a flat surface on the top of said bar, means for moving said bar transversely in a circle, and means for maintaining said flat surface in a horizontal position.

27. In a match-making machine, dipping apparatus comprising a pivotally supported bar, a plane surface on the top of said bar, means for moving said bar transversely in a circle, means for maintaining said plane surface in a horizontal position, a body of matchhead-forming substance into which said bar dips at the lower portion of the circle, and means for passing match ends across the upper portion of said circle.

28. In a match-making machine, dipping apparatus comprising a pivotally supported bar, a plane surface on the top of said bar, means for moving said bar transversely in a circle, means for maintaining said plane surface in a horizontal position, and a plate having its bottom edge at the bottom of the circle for scraping off chemical from the top of the bar.

29. In a match-making machine, dipping apparatus comprising a pair of rotating wheels, a number of pivot pins disposed therein equally spaced from the center thereof, a number of bars rigidly connected to said pivots between said wheels, a pair of driving wheels disposed on the remote sides of the first-mentioned wheels and having their centers offset with respect thereto, and links rigidly connected to said pivots at one end and pivoted to the driving wheels at the other end.

30. In a match-making machine, mechanism for bending free ends of tongues out from a web or strip having tongues for forming match splints formed therein and arranged in rows transversely of the web, the tongues being spaced transversely of the web and the tongues of adjacent rows being disposed in staggered relation, the tongues being at least partially severed from the web on two sides and one end, said mechanism comprising an endless linkbelt, each link thereof having a tooth thereon for bending a free end of a tongue, said links being disposed in transverse rows and the links of each row being spaced and staggered with respect to the links of adjacent rows, means for holding the continuous web or strip against the linkbelt, and means for feeding said web between the endless linkbelt and the holding means.

31. In a match-making machine, mechanism for bending free ends of tongues out from a web or strip having tongues for forming match splints formed therein and arranged in rows transversely of the web, the tongues being spaced transversely of the web and the tongues of adjacent rows being disposed in staggered relation, the tongues being at least partially severed from the web on two sides and one end, said mechanism comprising the combination of a roller having teeth thereon, an endless linkbelt, each link thereof having a tooth thereon for bending a free end of a tongue of the web against the face of a tooth on the roller, said links being disposed in transverse rows and the links of each row being spaced and staggered with respect to the links of adjacent rows, and means for feeding said web between the endless linkbelt and the roller.

32. In a match-making machine, mechanism for bending free ends of tongues out from a web or strip having tongues for forming match splints formed therein and arranged in rows transversely of the web, the tongues being spaced transversely of the web and the tongues of adjacent rows being disposed in staggered relation, the tongues being at least partially severed from the web on two sides and one end, said mechanism comprising the combination of a roller having round faced teeth thereon, an endless linkbelt, each link thereof having a dull tooth thereon for bending a free end of a tongue of the web against the round face of a tooth on the roller, said links being disposed in transverse rows and the links of each row being spaced and staggered with respect to the links of adjacent rows, and means for feeding said web between the endless linkbelt and the roller.

JOHN RINNE.